(12) United States Patent
Brodersen

(10) Patent No.: US 7,669,823 B2
(45) Date of Patent: Mar. 2, 2010

(54) SWIVEL SEAT AND SUSPENSION APPARATUS

(75) Inventor: Cole T. Brodersen, Davenport, IA (US)

(73) Assignee: Sears Manufacturing Co., Davenport, IA (US)

( * ) Notice: Subject to any disclaimer, the term of this patent is extended or adjusted under 35 U.S.C. 154(b) by 426 days.

(21) Appl. No.: 11/702,900

(22) Filed: Feb. 6, 2007

(65) Prior Publication Data

US 2008/0185891 A1 Aug. 7, 2008

(51) Int. Cl.
*F16M 13/00* (2006.01)
(52) U.S. Cl. .................... 248/421; 248/631; 297/344.16
(58) Field of Classification Search ............ 297/344.15, 297/344.16, 344.26; 248/157, 421, 562, 248/585, 591, 595, 631
See application file for complete search history.

(56) References Cited

U.S. PATENT DOCUMENTS

| | | | | |
|---|---|---|---|---|
| 634,084 | A | * | 10/1899 | Gould ......................... 248/419 |
| 2,132,363 | A | * | 10/1938 | Thomas et al. .............. 297/325 |
| 2,893,470 | A | * | 7/1959 | Peller ......................... 248/565 |
| 3,319,920 | A | * | 5/1967 | Freedman et al. ........... 248/567 |
| 3,596,982 | A | * | 8/1971 | Grams ........................ 297/71 |
| 3,758,064 | A | * | 9/1973 | Sawaki ....................... 248/601 |
| 4,022,411 | A | * | 5/1977 | Rumsey ...................... 248/580 |
| 4,134,617 | A | * | 1/1979 | Matsubara ............. 297/344.15 |
| 4,227,670 | A | * | 10/1980 | Vander Burgh et al. ..... 248/416 |
| 5,542,638 | A | * | 8/1996 | Smith ......................... 248/421 |
| 6,202,972 | B1 | * | 3/2001 | Manavi ...................... 248/421 |

* cited by examiner

*Primary Examiner*—Peter R. Brown
(74) *Attorney, Agent, or Firm*—Niro, Scavone, Haller & Niro

(57) ABSTRACT

The present invention is directed to a seat and seat suspension assembly comprising a seat mounted to a seat supporting platform and suspension mechanism, the platform and suspension mechanism being rotationally mounted to a base by a pedestal so that the platform, suspension mechanism and seat may rotate through 360 degrees. The pedestal comprises two swivel housings, the first swivel housing being mounted in fixed position on the base and the second swivel housing being rotationally mounted to the first and supporting the suspension mechanism, platform and seat. A suspension spring and damper are associated with the suspension mechanism to enhance the ride characteristics of the seat, with the damper being positioned inside the pedestal and having one end connected to the first swivel housing and the other end connected to the suspension mechanism.

3 Claims, 3 Drawing Sheets

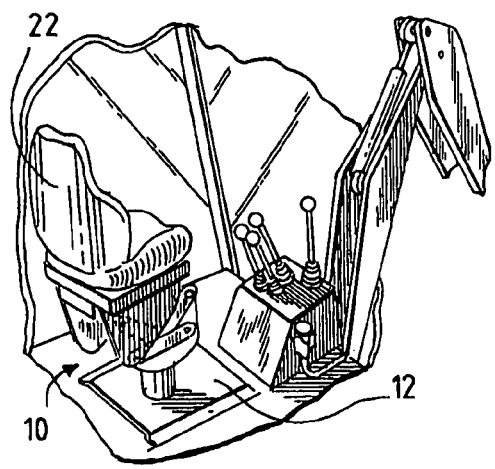
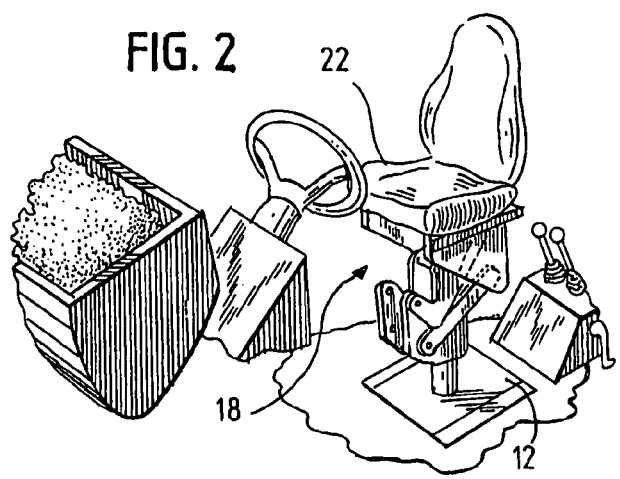
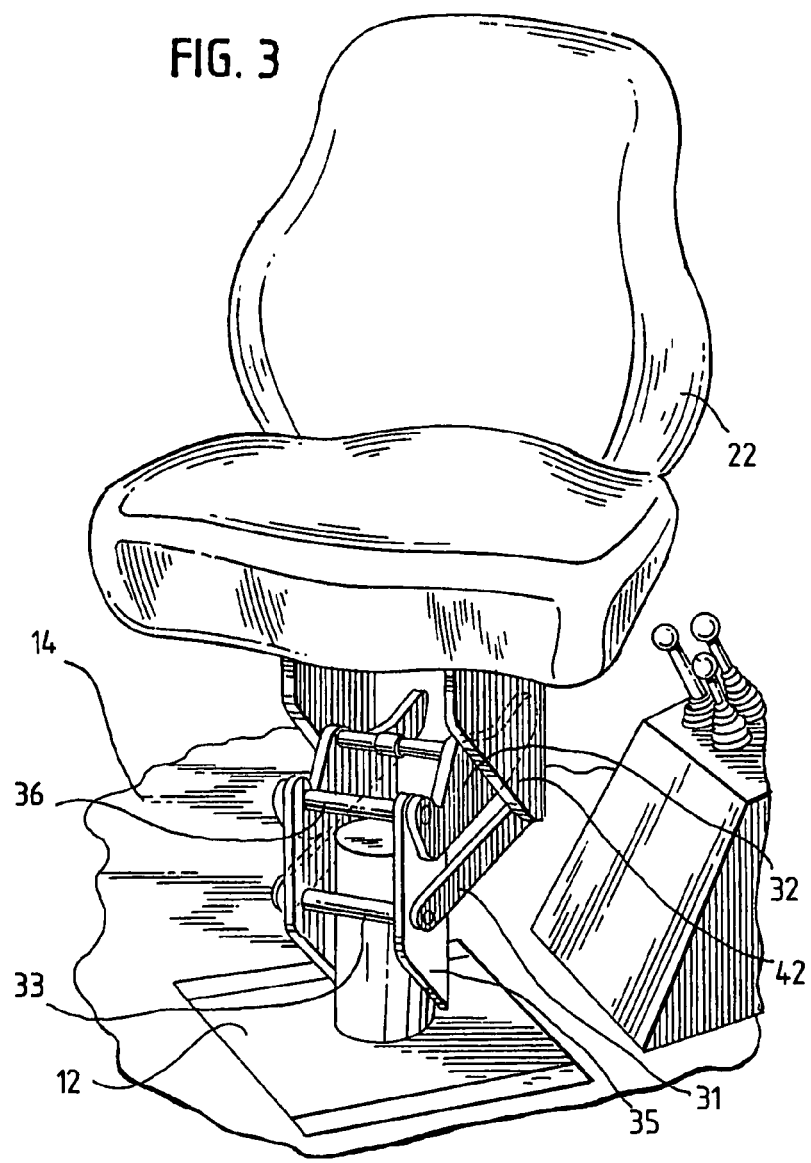

US 7,669,823 B2

SWIVEL SEAT AND SUSPENSION APPARATUS

BACKGROUND OF THE INVENTION

The present invention relates generally to seat equipment and more particularly to a swivel seat and seat suspension assembly for use in off the road vehicles, such as bulldozers, tractors and back hoes.

A variety of seat and seat suspension designs have been adapted to the specialized needs of off the road vehicles. In some of these vehicles, and particularly in the case of back hoes, it is important that the operator have the ability to swivel or rotate in the seat to face either end of the vehicle. It is desirable therefore that the seat has as much rotational capacity as possible, and preferably that it have the functionality to rotate through a full 360 degrees and even the functionality to continue rotation in the same direction through more than 360 degrees. In addition, because the cab or operator compartment may be relatively small, it is also important that the seat and the seat suspension assembly occupy as small an envelope or "footprint" as possible. The need for a compact design extends to the lowermost components of the assembly, so that the operator has sufficient leg and foot room as he or she rotates in the seat from front to back operating positions.

A need therefore exists for a small, compact and simple swivel seat and seat suspension assembly that is capable of a full rotational freedom while still affording the operator with enhanced ride characteristics.

SUMMARY OF THE INVENTION

The present invention is directed to a seat and seat suspension assembly comprising a seat mounted to a seat supporting platform and suspension mechanism, the platform and suspension mechanism being rotationally mounted to a base by a pedestal so that the platform, suspension mechanism and seat may rotate freely through 360 degrees or more. The pedestal comprises two swivel housings, the first swivel housing being mounted in fixed position on the base and the second swivel housing being rotationally mounted to the first housing and supporting the suspension mechanism, platform and seat. A suspension spring and damper are associated with the suspension mechanism to enhance the ride characteristics of the seat. In one embodiment, the damper is positioned inside the pedestal and has one end connected to the first swivel housing or base and the other end connected to the suspension mechanism. In an alternative embodiment, the damper is positioned outside the pedestal.

The seat and seat suspension assembly of the present invention allows the operator to rotate fully through 360 degrees or more. It also minimizes the lower footprint requirements for the seating equipment thereby providing substantial leg and foot room to the operator. Moreover, the invention allows the use of a spring and damper arrangement or even an active suspension arrangement using hydraulic damping or actuation, while shill permitting complete rotational freedom.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIGS. 1 to 3 are all perspective views showing one preferred embodiment of the present invention as it might be typically installed in the cab of an off the road vehicle;

DETAILED DESCRIPTION OF THE PREFERRED EMBODIMENTS

Figure 4:
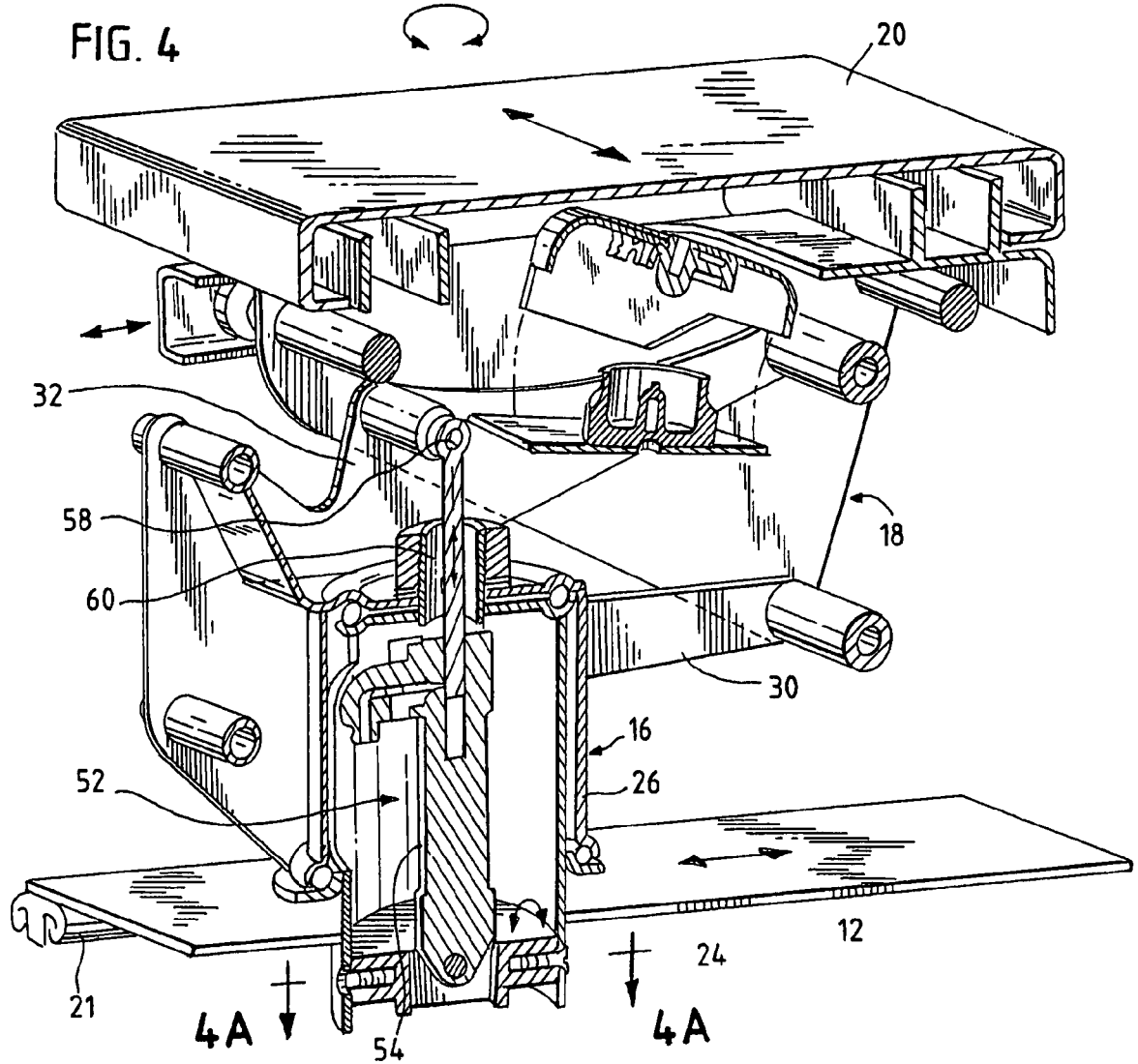
FIG. 4 is a perspective view and cross section showing details of construction of the preferred embodiment.

With reference to FIGS. 1-3, the swivel seat and suspension assembly 10 of the present invention is illustrated in a typical installation within the cab of an off-the-road vehicle, such as a back hoe. The seat and suspension assembly 10 is positioned within the cab or occupant space in a way to permit 360 degree rotation, allowing the vehicle operator to rotate freely in either direction to face either end of the vehicle. Assembly 10 includes a base 12 secured to the cab floor 14, a pedestal 16, a suspension mechanism 18, a seat platform 20 and seat 22.

Figure 5:
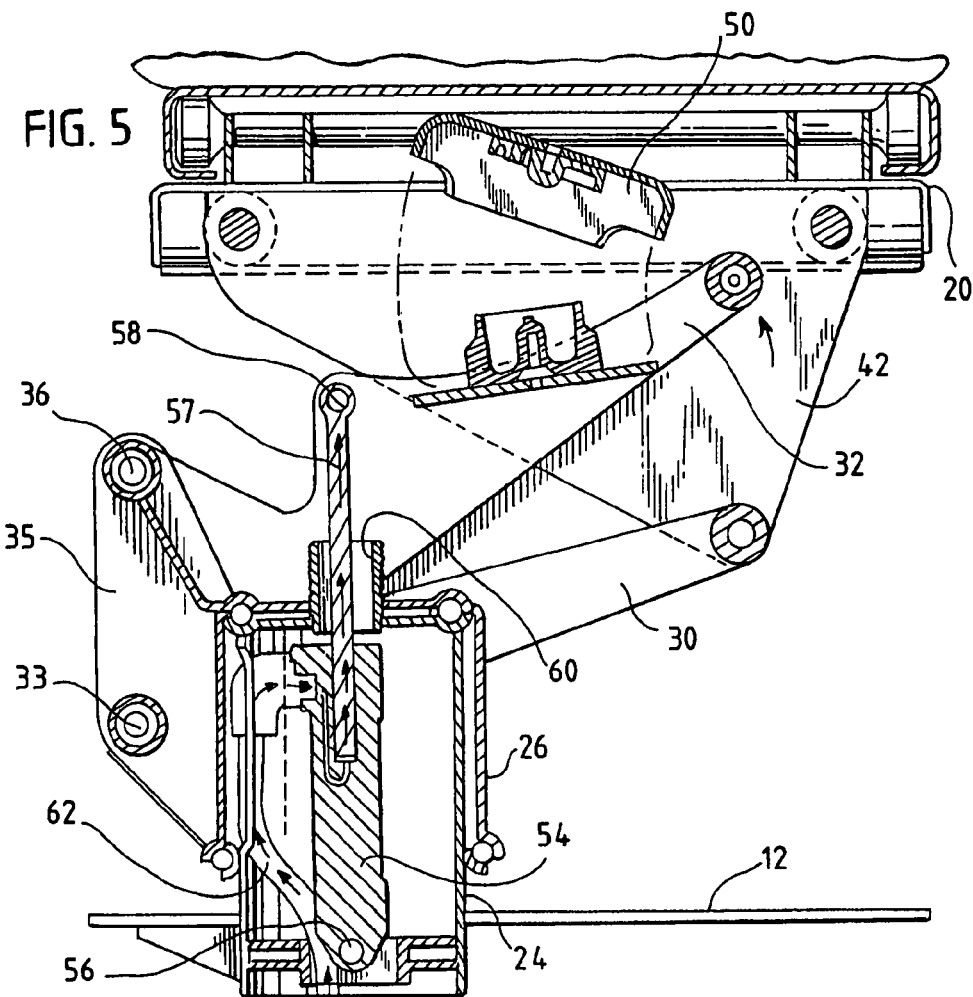
FIGS. 5 and 6 are cross sectional views similar to that shown in FIG. 4, but showing additional active suspension components and illustrating the seat and suspension assembly in raised and lowered positions, respectively.
Figure 6:
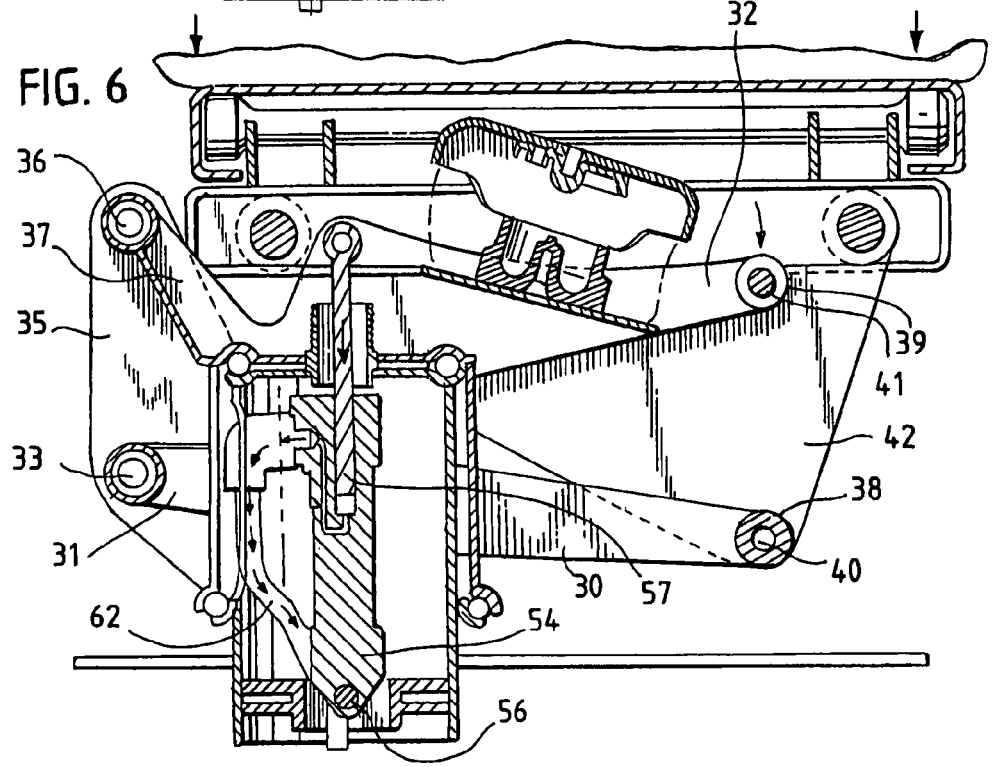

FIGS. 4-6 show further details of the construction of seat assembly 10. Base 12 may be a stationary plate, bolted or welded to the cab floor 14, or it may be a formed sheet metal structure mounted on slides 21 to allow for/aft adjustment of the seat position.

The pedestal 16 is constructed with a stationary lower swivel housing 24 and a rotating upper swivel housing 26. The seat suspension mechanism 18 is mounted to and rotates with the upper swivel housing 26 and, in the illustrated embodiment, includes generally parallel support linkages in the form of links 30 and 32. Each of the links 30 and 32 has a first end connected to the pedestal. As illustrated, links 30 have ends 31 attached at pivot 33 on lower suspension bracket 35 which, in turn, is secured to the upper swivel housing. Likewise, links 32 have ends 37 attached at pivot 36 on the lower bracket 35. The other ends 38 and 39 of links 30 and 32 are attached at pivots 40 and 41 on an upper suspension bracket 42 which also serves as a support member for seat platform 20. This parallel linkage allows the seat platform 20 and seat 22 to move vertically as illustrated in FIGS. 5 and 6, while the platform and seat remain substantially horizontal.

The seat suspension platform 20 may be a fixed plate or frame to which the seat 22 is attached or, as illustrated, may include a fore/aft isolation sub assembly or a lateral isolation sub assembly or both such isolation devices. Any of a variety of isolation designs well known to those skilled in the art may be employed in the practice of the present invention.

In addition, a mechanical or air spring 50 may be employed together with a damper 52 to enhance the ride characteristics of the seat and suspension assembly. In accordance with one embodiment of the present invention, the damper is most preferably positioned within pedestal 16, having its lower end connected to the base 12 or lower swivel housing 24. The upper end of the damper is connected to the suspension mechanism 18. In the preferred embodiment, the damper cylinder 54 is secured to a gimbal mounting device 56, which may take the form of a double axis or ball and socket mounting structure. In turn, the piston rod 57 of damper 52 is secured at its upper end to pivot 58 on upper link 32. The upper swivel cylinder 26 includes an aperture 60 having a size to accommodate the horizontal travel of piston rod 57 that results from rotation of link 32 about its pivot 36. So too, the gimbal mounting device 56 permits angular displacement or inclination of cylinder 54 that results from this same horizontal travel of piston rod 57. The air spring 50 is mounted between the seat platform 20 and upper link 32 in a manner well known to those skilled in the art.

While the above description relates to a passive damper, a hydraulic actuator may be used when an active suspension system is desired. The hydraulic plumbing 62 required for an actuator may be conveniently located within the lower stationary swivel housing 24, as illustrated in FIGS. 5 and 6.

Figure 4A:
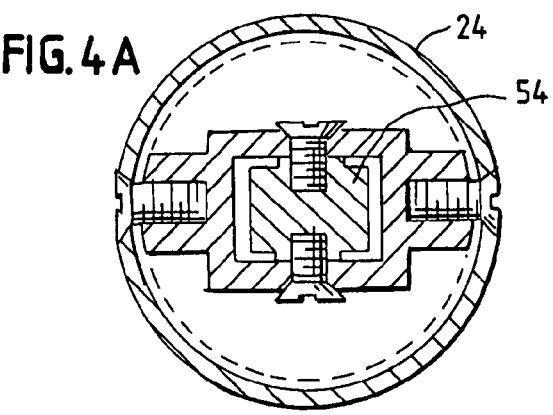
FIG. 4A is an enlarged cross section taken along line 4A-4A of FIG. 4 and illustrating one preferred form of a gimbal device useful in the practice of the present invention.

In accordance with the preferred embodiment illustrated in FIG. 4A, the damper cylinder 54 is mounted at its lowermost end 70 via a double axis gimbal 56 to the lower end of the first and stationary swivel housing 24. The gimbal 56 includes pins 72 and 74 which serve as rotational axes that permit cylinder 54 to incline in the operation of the suspension as described above.

In another embodiment, the damper may be mounted to the outside of the upper swivel housing 26. In this arrangement, the damper cylinder 54 is mounted to the swivel housing 26 via a bracket or flange, and the damper piston rod 32 is mounted to the parallel linkage of the suspension mechanism in the same or similar manner as described above.

It will be appreciated by those skilled in the art that various changes and modifications may be made to the illustrated embodiments without departing from the spirit of the present invention. All such modifications and changes are intended to be covered by the appended claims.

I claim:

1. A vehicle seat suspension apparatus, comprising:
   a base;
   a stationary swivel housing and a rotational swivel housing together forming a pedestal supported by the base;
   a seat supporting platform;
   a suspension mechanism connecting the pedestal and the platform;
   an hydraulic shock absorber having a non-rotational cylinder connected to either the base or the stationary housing and a piston extending upwardly from the cylinder through the rotational housing and connecting to the suspension mechanism;
   a spring connected to the seat suspension mechanism; and
   a gimbal mounting device connecting the hydraulic shock absorber to the base or stationary swivel housing, thereby permitting inclination of the actuator as the suspension mechanism or seat supporting platform moves;
   wherein the seat supporting platform, suspension mechanism, and spring are able to rotate through 360 degrees while the base, stationary swivel housing and shock absorber cylinder remain rotationally fixed, and a gimbal mounting device to connect the hydraulic shock absorber to the base or stationary swivel housing, thereby permitting inclination of the actuator as the suspension mechanism or seat supporting platform moves.

2. The suspension apparatus of claim 1 wherein the suspension mechanism comprises generally parallel support linkages, each having one end connected to the pedestal and the other end connected to a platform support member.

3. The suspension apparatus of claim 2 wherein the support linkages include a pair of lower links, each generally parallel to one of a pair of upper links, and the shock absorber piston is connected at one end to the upper links.

* * * * *